Feb. 26, 1929.  H. S. FOLKER  1,703,578
TRAIN STOP VALVE
Filed Oct. 6, 1926   3 Sheets-Sheet 2

INVENTOR
Howard S. Folker
BY White & Prost
his ATTORNEYS

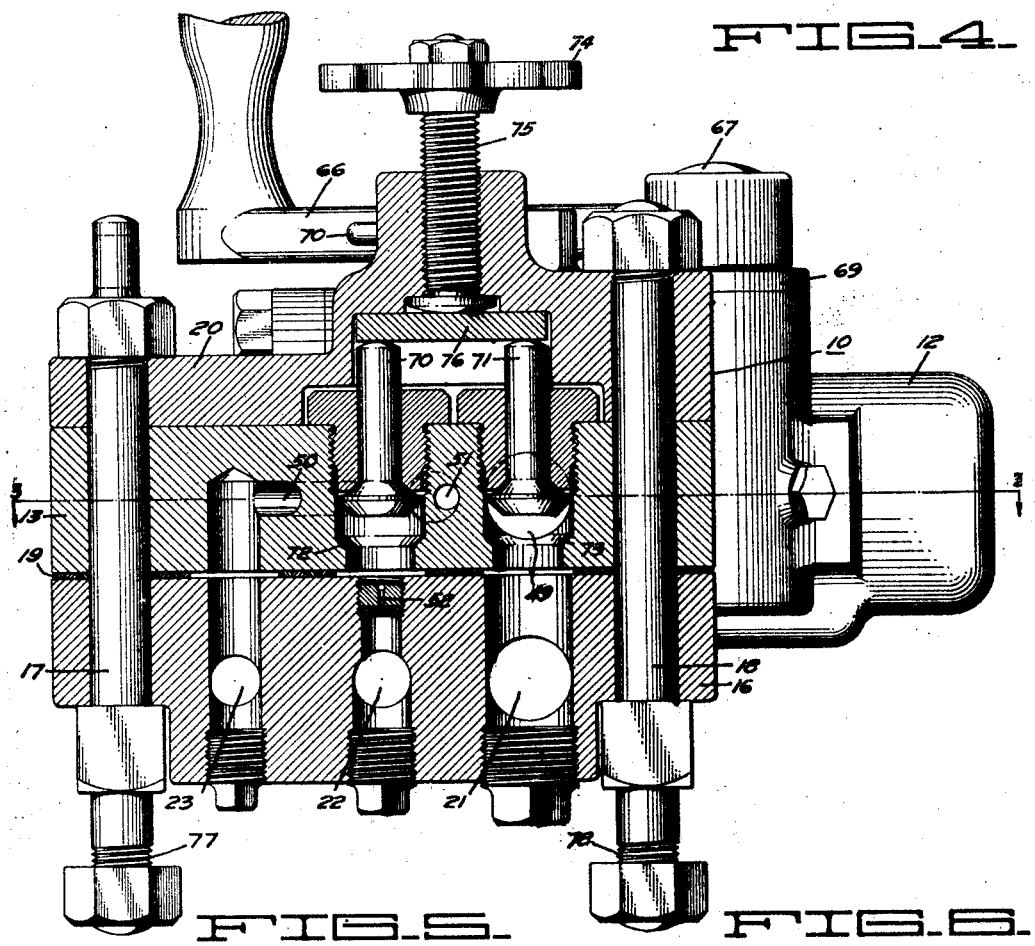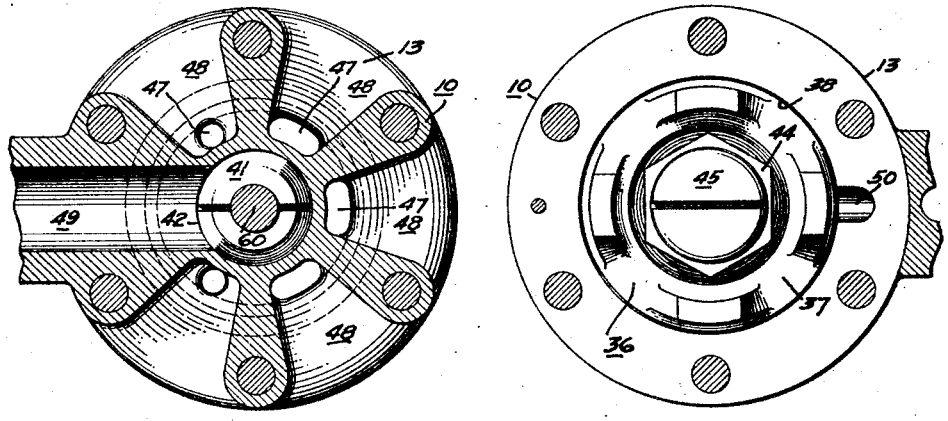

Patented Feb. 26, 1929.

1,703,578

UNITED STATES PATENT OFFICE.

HOWARD S. FOLKER, OF MILL VALLEY, CALIFORNIA, ASSIGNOR TO NATIONAL SAFETY APPLIANCE COMPANY, OF RENO, NEVADA, A CORPORATION OF NEVADA.

TRAIN-STOP VALVE.

Application filed October 6, 1926. Serial No. 139,850.

This invention relates generally to automatic valves for use with pneumatic braking equipment.

Pneumatic braking systems for steam or electric railroads generally utilize a source of air under pressure which serves to apply the brakes upon venting air to the atmosphere from a brake pipe. It has previously been proposed to automatically control such brakes by means of a suitable automatic train control or train stop system. Such a system is shown in the Patent No. 1,439,081 issued December 19, 1922 to H. S. Folker. In the application of such systems to trains hauled by locomotives it has generally been found advantageous to employ a valve device which functions to cause an automatic service application of the brakes. In the above mentioned patent the train stop valve disclosed is of that kind, and is shown in combination with a separate "release cock" for restoring the apparatus to normal condition after an automatic brake application has occurred. In the extension of such systems to the passenger trains of electric railways, in connection with the brake equipment commonly used on those trains, I have found that an emergency application of the brakes is open to no serious objection and has certain advantages.

It is therefore an object of this invention to devise a novel form of valve which will effect an emergency application of pneumatic brakes responsive to a predetermined actuation received from a suitable controlling device on the track.

It is a further object of this invention to devise an automatic stop valve having means for venting a brake control pipe to apply the brakes, said means continuing in venting condition irrespective of the condition of the automatic control for the valve.

It is a further object of this invention to devise a valve of this type which may readily be installed with the standard pneumatic braking systems of electric railways.

It is a further object of this invention to devise an automatic brake valve which may be manually released or reset by a common operating member.

It is a further object of this invention to devise an automatic brake valve which will be fool proof in that an operator may not render it ineffective to stop the train.

Further objects of the invention will appear from the following description in which has been outlined in full that form of the invention which I have selected for illustration. It is to be understood that the invention is to be accorded a range of equivalents consistent with the state of the prior art.

Referring to the drawings:

Fig. 4 is a cross sectional view taken along the line 4—4 of Fig. 2.

Fig. 5 is a cross sectional detail taken along the line 5—5 of Fig. 3.

Fig. 6 is a cross sectional detail view taken along the line 6—6 of Fig. 3.

Figure 1:
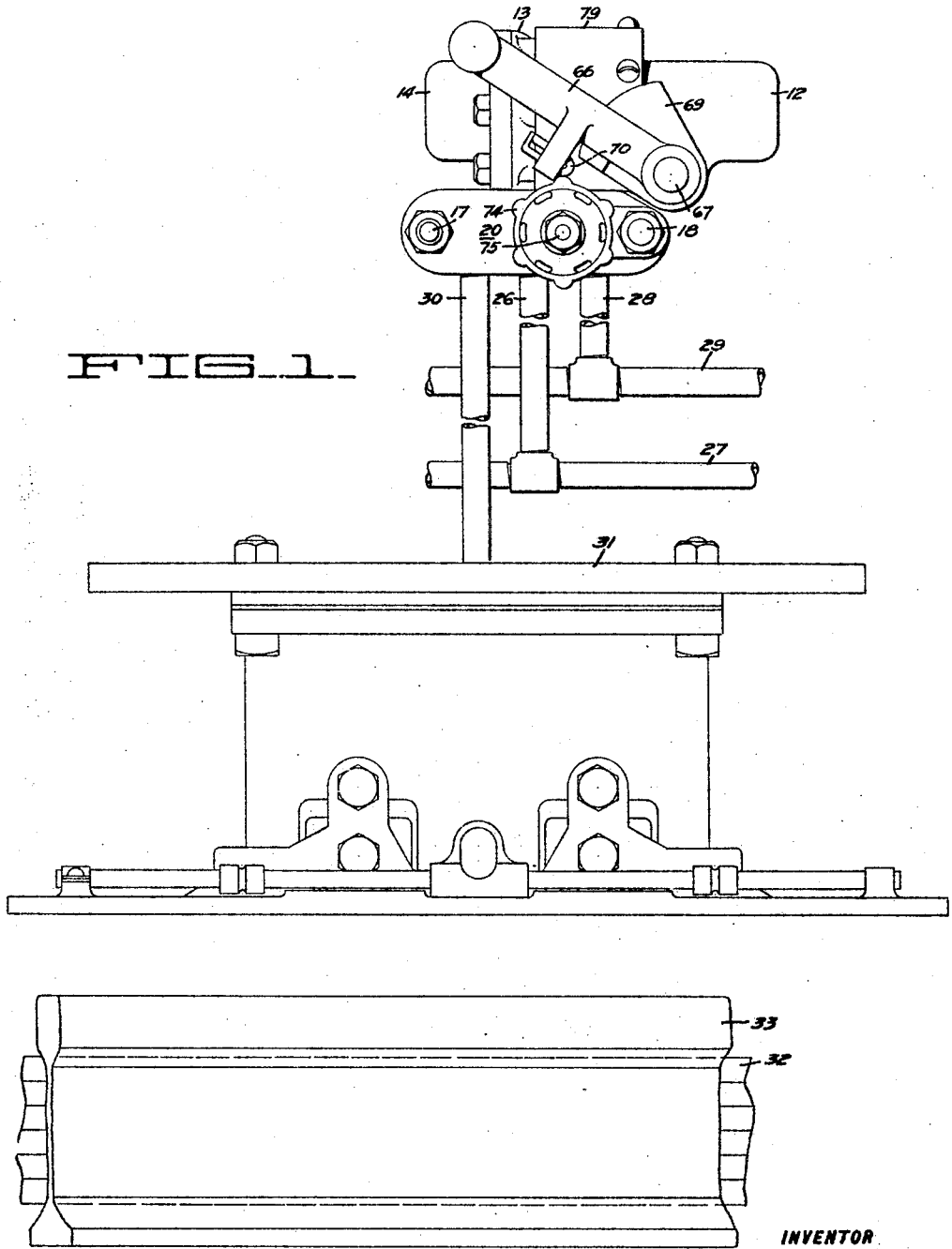
Figure 1 is a diagrammatic view illustrating the invention as incorporated with a standard pneumatic braking system.
Figure 2:
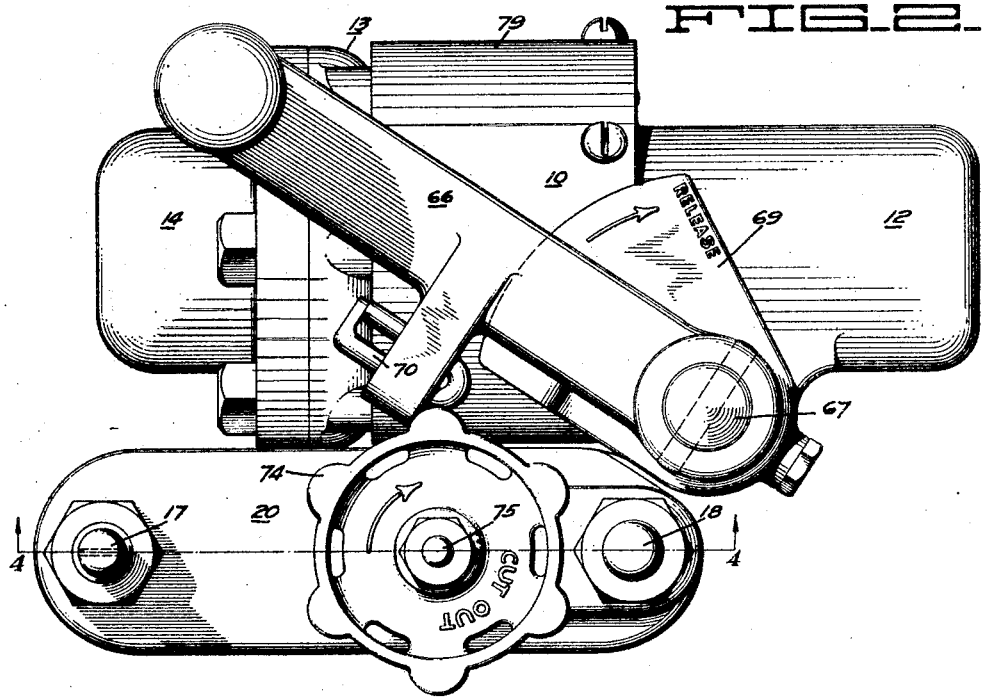
Fig. 2 is a front elevation of the automatic stop valve shown in Fig. 1.

The invention comprises generally a valve which is particularly adapted to be placed in communication with the main reservoir and a pipe, the venting of which causes a brake application, in the usual braking equipment of electric trains. The valve has special application as a means for venting the emergency pipe of such equipment in order to secure an emergency application of the brakes. It may be installed however with any pipe the venting of which will cause a brake application. As this pipe may have different names in different types of braking equipment, including the brake pipe of steam train equipment to which the valve is also applicable, it will be referred to broadly as the brake application pipe. Automatic control of the valve is secured by variation of pressure on one side of a movable valve member, this variation being preferably secured by means of a control pipe associated with suitable means serving to vent compressed air from the pipe in response to an actuation received from a track device. The valve includes a brake application valve member movable automatically to vent the air in the brake application pipe upon venting of the air in the control pipe. A penalty valve member is also provided for venting the brake application pipe, this valve member being operated by the same manual lever which serves to restore the application valve member to normal position, so that the brake application is continued during a restoring operation until the lever is returned to normal position. The penalty valve member also causes a brake application if the lever is at any time improperly moved to, or fastened in, release position. After the valve has been automatically operated to stop the train, it will remain in this condition until manually reset.

Thus referring to the drawings, there is shown a body member 10 for housing the various valve mechanisms, this body member for convenience in manufacturing being preferably constructed of a plurality of parts which may be readily secured together, such for example as a pressure head 14, a spring housing 12 and an intermediate body portion 13. To facilitate making the necessary pipe connections to the device, the intermediate body portion 13 has been shown as provided with a connection flange 16. While the connection flange 16 may be formed integral with the intermediate body portion 13 it is preferably formed as a separate member as shown in Fig. 4 and bolted to the intermediate body portion by suitable means such as bolts 17 and 18. A gasket 19 is shown as inserted between opposed faces of the body portion 13 and connection flange 16 in order to secure an air-tight connection. The bolts 17 and 18 may also serve to secure a screw head 20 to the intermediate body portion, this screw head being for a purpose later to be described.

The connection flange 16 is provided with a plurality of air ports or passageways 21, 22 and 23 for the purpose of establishing communication with the necessary pipe connections which are made to this flange. Referring to Fig. 1, pipe 26 which is in communication with passageway 22, is connected to the main reservoir pipe line 27. Pipe 28, which is in communication with passageway 21, is connected with the brake application pipe 29. With some brake systems however, passageways 21 and 22 may have a common connection to the brake application pipe, so that air will be supplied to the valve entirely from that pipe, and a separate connection to the main reservoir pipe may be obviated. Passageway 23 is placed in communication with the control pipe 30 which may itself be merely a passageway, as in the case of the quite practicable mounting of the train stop valve directly upon the control valve 31 or other primary actuating means. Control of the valve mechanism by means of pipe 30 is accomplished by a variation in the pressure within this pipe, as by venting the pipe to the atmosphere. For example, the pipe 30 may be vented by means of a tripping mechanism located upon some portion of the train and adapted to engage a member located adjacent the track, or as shown in the drawings, it may be vented by means of a magnetically operated valve 31 such as described in Patent No. 1,439,081, to which reference has previously been made. This valve is located at some suitable point on the train and is adapted to pass over a suitable inductor magnet 32 located adjacent the track 33. Flow of current in the windings of the magnet 32 is controlled by the usual signal and track circuits, so that the windings are energized and the permanent magnetic field is said to be neutralized, when a train approaches under clear track conditions; while, under contrary conditions, the windings are deenergized and the permanent magnetic field affects the valve 31 to vent the air within pipe 30.

In order to vent the brake application pipe 29 and thus apply the brakes responsive to venting of the control pipe 30 by the magnetic control valve 31, a valve mechanism is provided which is operated by differential pressures. Thus there is shown a movable application valve member 36 which includes a suitable valve disc 37 loosely guided within the bore 38. The disc 37 is adapted to cooperate with the stationary valve seat 39 and accordingly is provided with a suitable seating ring 40. The valve disc 37 is also shown as guided by means of a guide member 41 which slidably extends within a bore 42 in the intermediate body portion 13. This guide member 41 for example may be provided with a threaded extension 43 for securing the same to the disc 37, a jamb nut 44 being threaded upon the projecting portion of the extension 43. The jamb nut is shown as closed by means of a threaded plug 45. The stationary valve seat 39 is preferably grooved as at 46 in order to divide the stationary seat in two separate parts. This groove is in communication with the atmosphere through ports 47 which communicate with openings 48 in the body portion. Passageway 21, which is normally connected with the brake application pipe, is in communication with the bore 42 by means of passageway 49. Passageway 23, which is connected with the control pipe, is in communication with the interior of the pressure head 14 and accordingly is in communication with the bore 38, through passageways 50. Passageway 22, which is in communication with the main reservoir, is in communication with bore 38, adjacent the inner face of the valve disc 37 by means of passageway 51. Entrance of air from the main reservoir to the passageway 51 is preferably restricted as by means of a small orifice 52 which is shown as secured within the connection flange 16.

Figure 3:
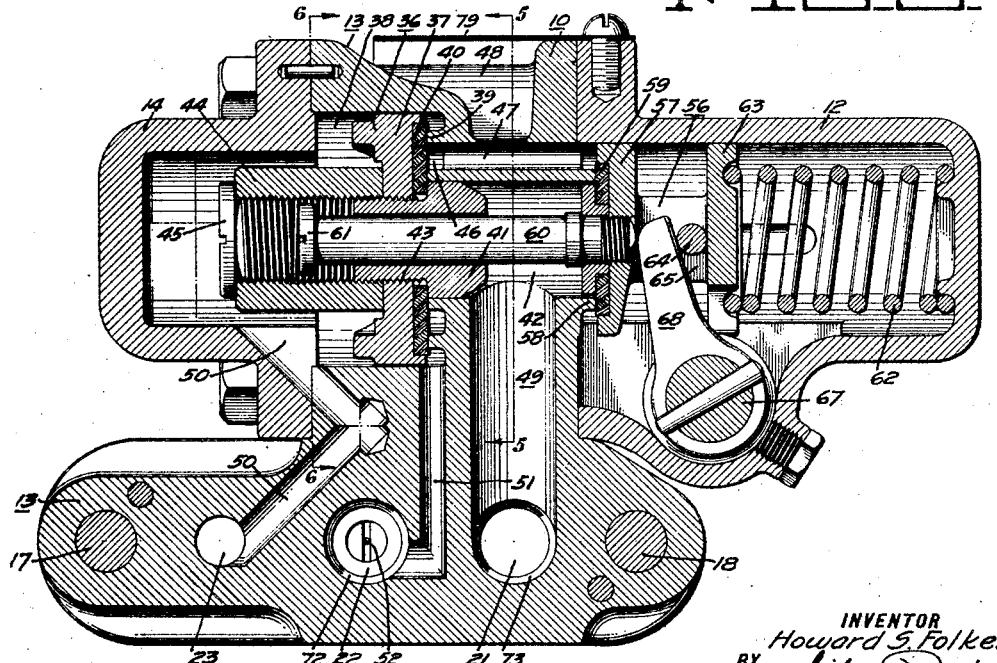
Fig. 3 is a cross sectional view taken along the line 3—3 of Fig. 4.

When the application valve member is moved to its normal position shown in Fig. 3, in which the valve disc 37 seats upon the stationary valve seat 39, it will be obvious that a certain amount of air from the main reservoir will flow through the orifice 52, passageway 51 and around the periphery of the valve disc 37 to build up a pressure within the control pipe 30 and the pressure head 14, assuming of course that the magnetic control valve 31 is closed. Furthermore, under normal conditions a pressure will exist in the brake application pipe 29 and correspondingly within the bore 42, which may be equal to that in the pressure head 14. However, because of the relatively wide face of the stationary valve seat 39, the area of the outer portion of the application valve member which is exposed to the pressure within the head 14 is relatively large compared to that area exposed to the air pressure within the bore 42 so that the valve member is forced tightly against its seat. However, a certain reduction of the pressure within the head 14 as by venting the control pipe 30 results in the force exerted by the air within the bore 42 being sufficient to force the valve member outwardly away from its seat. When this occurs air from bore 42 is immediately vented to the atmosphere by way of ports 47 and openings 48. This venting of air from the brake application pipe will of course cause an application of the brakes to stop the train. Furthermore, by reason of the relatively large capacity of the outlet past valve seat 39 and through ports 47 and openings 48, air is vented from the brake application pipe at such a rate that an emergency brake application is caused, even though air is at the same time being supplied to that pipe through the usual connections of the brake system. Obviously, however, the ports may be proportioned to give any rate of venting desired.

When the automatic application valve has been operated or unseated, it will remain in this position until reset. A manual control is therefore provided for effecting the resetting operation and in order to insure against use of this control to render the automatic stop ineffective, means are provided for venting air from the brake application pipe during the resetting operation. Thus slidably disposed within the spring housing 12 there is a penalty valve member 56 which includes a valve disc 57. The disc 57 is adapted to cooperate with a stationary valve seat 58 and is accordingly provided with a suitable seating ring 59. The penalty valve 56 is mechanically connected to the application valve 36 by suitable means such as a stem 60 having one of its ends secured to the disc 57 and its other end provided with a head 61 which is disposed beyond the extension 43 of the guide member 41. This connection is therefore such that the penalty valve member 56 may be moved a certain distance off its seat before it moves the application valve member to its normal or reset position. The penalty valve is normally biased to closed position as by means of a compression spring 62 having its one end seated upon the end of the spring housing 12 and its other end abutting against a plate 63 which is fixed to the outer side of the valve disc 57. For guiding the penalty valve diametrically opposite sides of the spring housing 12 may be grooved to receive the ends of a pin 64 which is inserted through the spaced members 65 which interconnect the plate 63 with the valve disc 57.

For manually actuating the valves there is provided a suitable release lever 66 which is disposed externally of the valve body and secured to a rotating shaft 67 journaled within the spring housing 12. The shaft 67 has also fixed thereto an arm 68 which extends between the spaced separating members 65 and engages pin 64, thus serving to move the valve member 56 away from its stationary seat and member 36 against its seat, upon movement of the release lever 66 to release position. For convenience the body member of the valve may be provided with a suitable quadrant 69 adjacent the hand lever 66, which may bear suitable characters to indicate the normal or release position of the lever. A slidable locking bolt 70 may also be mounted upon the hand lever so that it may be locked in normal position if desired. Obviously the release lever 66 or shaft 67 may be provided with an extended connection for convenient operation where the valve may be mounted in an inaccessible place. Remote control or automatic operation of the release lever may be provided for, as by means of a pneumatic cylinder and piston with the piston rod connected to the lever, the supply of air to the cylinder being controlled in any desired manner.

In operation when the compressed air is vented from bore 38 through ports 50 and 23 and pipe 30 upon the opening of magnetic control valve 31, or other controlling device, there is an immediate and considerable drop of pressure on the left side of valve disc 37, due to the very much restricted supply of air from main reservoir through orifice 52. Valve disc 37 is therefore unseated and forced to the left by the pressure of air in bore 42, derived from the brake application pipe. This movement of valve disc 37 not only vents the brake application pipe to the atmosphere past the inner part of seat 39 and through ports 47 and openings 48, but also vents air from port 51 and any residual pressure from bore 38 past the outer part of the seat and through the same ports and openings, air from bore 38 being free to flow past loose fitting valve disc 37. A negligible flow of air from main reservoir to the atmosphere, restricted by orifice 52, continues while the valve remains in operated position, until the train is stopped and the valve is manually restored to normal or closed position by operation of release lever 66. The venting of port 51 and bore 38 is for a purpose more particularly connected with the operation of the type of control valve 31 with which the stop valve has been illustrated. This venting immediately after an operation of valve disc 37, effects a reduction of pressure practically to atmospheric, in pressure head 14 (communicating with bore 38), ports 50 and 23, pipe 30 and the control valve. In consequence, as fully explained in Patent No. 1,439,081, to which reference has previously been made, the control valve closes, and, having been carried by movement of the train beyond magnet 32, is thereafter magnetically held closed. Due to the continued venting of air from port 51 however, no pressure is built up in the connections to the control valve and bore 38 on the left side of valve disc 37. Consequently, although the control valve is closed immediately after its actuation has resulted in operation of valve disc 37, the valve disc remains in operated position and the brake application continues until the train is stopped.

The train stop valve is preferably mounted in such a place upon the car that the motorman can reach it only by getting down upon the ground. After the train has been stopped by an automatic actuation, the motorman may restore normal conditions, permitting release of the brakes, by moving hand lever 66 to release position and allowing it to return to normal position. This movement of the hand lever forces valve disc 57 to open position, against the tension of spring 62, thereby opening an additional vent from the brake application pipe to the atmosphere through ports 47 and openings 48, and at the same time, through stem 60, moves valve disc 37 against its seat. Venting of air from port 51 being thus stopped, air pressure, retained by the closed control valve, builds up in bore 38 and the connections and acts against the left side of the valve disc to maintain the disc in its closed position. As soon as the hand lever is let go by the motorman, it and the valve disc 57 are returned to their normal positions by spring 62. Both vents from the brake application pipe are then closed, pressure builds up therein, and the brakes may be released. Obviously, as long as the hand lever is held in release position, or if it is permanently fastened in that position, continued venting of the brake application pipe will keep the brakes applied; and movement of the lever when the brakes are not already applied, will at once cause a brake application. Therefore, the train cannot be moved unless the hand lever is in normal position so that, head 61 of stem 60 being in its normal position as shown in Fig. 3, valve disc 37 is free to be operated automatically.

It is desirable in devices of this kind to be able to entirely cut out the operation or effect of the valve, as in case of some accidental derangement causing a brake application that cannot be released in the regular way. Thus means has been provided for interrupting communication between the stop valve and reservoir pipe 27 and brake application pipe 29. Referring to Fig. 4, the particular mechanism employed comprises a pair of movable valve members 70 and 71 which are adapted to cooperate with stationary valve seats 72 and 73 respectively. Exterior of the valve there is arranged a hand wheel 74 mounted upon a threaded stem 75, the inner end of this stem serving to abut against a plate 76 interposed between the stem 75 and the valve members 70 and 71. Upon rotation of the hand wheel 74 the valve members 70 and 71 may be forced upon their seats to arrest communication between passageways 21 and 22 and the interior of the stop valve. When the stop valve is thus cut out, venting of air from the brake application pipe, due to the derangement of any part of the train stop apparatus, is prevented, as also is any useless flow of air from the main reservoir. Generally the hand wheel 74 is sealed in open position so that its use, involving breakage of the seal on any trip of the car, may be detected by inspection and must be accounted for at the end of the trip.

In order to prevent entry of dust or other substances into the interior of the valve, the openings 48 are preferably covered by means of a guard or shield 79.

I claim:

1. In an automatic train control system, a brake application apparatus comprising a body member in communication with a brake application pipe of an air brake equipment and also with a control pipe, means for varying the normal pressure in said control pipe, and means responsive to said variation in pressure but not responsive to subsequent return to normal condition of said pressure varying means, for venting air in said brake application pipe until a resetting operation is effected.

2. In an automatic train control system, a brake application valve comprising a body member in communication with a brake application pipe of an air brake equipment and also with a control pipe, and means comprising a movable valve mechanism within said body member for normally closing an outlet from said brake application pipe, said means upon venting of the control pipe serving to vent the brake application pipe and prevent restoration of pressure in the control pipe.

3. In an automatic train control system, a brake application valve comprising a body member having communication with an air brake equipment including a brake application pipe thereof and also having communication with a control pipe, a restricted passage forming another means of communication between the air brake equipment and the interior of said body member, and brake application pipe venting means comprising a valve mechanism within the body member movable to either closed or application positions, said mechanism having differential pressure areas exposed to the pressure of the control pipe and of the brake application pipe respectively whereby the valve is normally retained in closed position when the pressure within the control pipe is approximately equal to or above the pressure within the brake application pipe and is caused to move to application position to vent the brake application pipe and prevent restoration of pressure in the control pipe when the control pipe pressure is reduced below brake application pipe pressure in an amount determined by said differential pressure areas.

4. In an automatic train control system, in combination with a braking system having a source of air under pressure and a brake application pipe to be vented for applying the brakes, an automatic brake application valve having connection with said braking system including connection with said brake application pipe, a control pipe in communication with said valve, means operable upon a change of pressure in the control pipe for venting said brake application pipe, said means continuing in venting condition irrespective of removal of the cause of the change of pressure in the control pipe, and means for restoring the brake application pipe venting means to non-venting condition.

5. In an automatic train control system, a brake application valve comprising a body member having communication with an air brake equipment including a brake application pipe thereof and also having communication with a control pipe, a restricted passage forming another means of communication between the air brake equipment and the interior of said body member, brake application pipe venting means comprising a valve mechanism within the body member movable to either closed or application position, said mechanism having differential pressure areas exposed to the pressure of the control pipe and of the brake application pipe respectively whereby the valve is normally retained in closed position when the pressure within the control pipe is approximately equal to or above the pressure within the brake control pipe and is caused to move to application position to vent the brake application pipe and prevent restoration of pressure in the control pipe when the control pipe pressure is reduced below brake application pipe pressure in an amount determined by said differential pressure areas, and means for restoring the valve mechanism to normal or closed position.

6. In an automatic train control system, a brake application apparatus comprising a body member in communication with a brake application pipe of an air brake equipment and also with a control pipe, means for varying the normal pressure in said control pipe, means responsive to said variation in pressure but not responsive to subsequent return to normal condition of said pressure varying means, for venting air in said brake application pipe until a resetting operation is effected, and manually controlled means for restoring the brake application pipe venting means to non-venting condition.

7. In an automatic train control system, a brake application apparatus comprising a body member in communication with a brake application pipe of an air brake equipment and also with a control pipe, means for varying the normal pressure of said control pipe, means responsive to said variation in pressure but not responsive to subsequent return to normal condition of said pressure varying means, for venting air in said brake application pipe until a resetting operation is effected, additional means for venting air in the brake application pipe, and common means for effecting venting operation of said additional means and for restoring the brake application pipe venting means to non-venting condition.

8. An automatic brake application valve for use with a pneumatic brake system comprising a body member adapted to have pneumatic communication with a brake application pipe of said braking system and also with a control pipe, brake application pipe venting means including an application valve member within the body member movable from normal to a second position for venting air in the brake application pipe responsive to a reduction of pressure in the control pipe, additional means for venting air in the brake application pipe, and common means for effecting venting operation of said additional means and for restoring said application valve member to normal position.

9. An automatic brake application valve for use with a pneumatic braking system comprising a body member adapted to have pneumatic communication with a brake application pipe, brake application pipe venting means including an application valve member within the body member movable from normal to a second position for venting air in the brake application pipe, additional means for venting air in the brake application pipe, common means for effecting venting operation of said additional means and restoring said application valve member to normal position, and means for normally biasing said additional means to normal or non-venting position.

10. In an automatic train control system, a brake application apparatus comprising a body member in communication with a brake application pipe of an air brake equipment and also with a control pipe, means for varying the normal pressure in said control pipe, means responsive to said variation in pressure but not responsive to subsequent return to normal condition of said pressure varying means, for venting air in said brake application pipe until a resetting operation is effected, additional means for venting air in the brake application pipe, and a mechanical connection between the two venting means whereby movement of the additional venting means to venting condition restores the brake application pipe venting means to non-venting condition.

11. In an automatic train control system, a brake application apparatus comprising a body member in communication with the brake application pipe of an air brake equipment and also with a control pipe, means for varying the normal pressure in said control pipe, means responsive to said variation in pressure but not responsive to subsequent return to normal condition of said pressure varying means, for venting air in said brake application pipe until a resetting operation is effected, and means for interrupting communication between the brake application pipe and said apparatus thereby rendering said apparatus ineffective to vent the brake application pipe.

12. In an automatic train control system, a brake application apparatus comprising a body member in communication with a brake application pipe of an air brake equipment and also with a control pipe, a source of air under pressure in communication with said apparatus, means for varying the normal pressure in said control pipe, means responsive to said variation in pressure, but not responsive to subsequent return to normal condition of said pressure varying means, for venting air in said brake application pipe until a resetting operation is effected, and means for interrupting communication between the brake application pipe and said apparatus and between the source of air under pressure and said apparatus thereby rendering said apparatus ineffective to vent air from the brake application pipe and source.

13. In an automatic train control system, in combination with a braking system having a source of air under pressure and a brake application pipe to be vented for applying the brakes, an automatic brake application valve having connection with said braking system including connection with said brake application pipe, a control pipe in communication with said valve, means operable upon a change of pressure in the control pipe for venting said brake application pipe, said means continuing in venting condition irrespective of removal of the cause of the change of pressure in the control pipe, and means partly on a vehicle and partly on the track for venting the control pipe under predetermined conditions.

14. In an automatic train control system, a brake application apparatus comprising a body member in communication with a brake application pipe of an air brake equipment and also with a control pipe, primary actuating means on the vehicle adapted to cooperate with means on the track-way for venting the control pipe under predetermined conditions thereby varying the pressure within the same, and means responsive to said variation in pressure but not responsive to subsequent return to normal condition of said primary actuating means, for venting air in said brake application pipe until a resetting operaton is effected, said primary actuating means being adapted to resume its normal condition upon operation of the brake application pipe venting means and removal of the influence of the trackway means.

15. In a train control system operative to effect venting of the brake pipe of pneumatic brake equipment, means including a member movable in response to a track signal for effecting venting of said brake pipe, means including another member movable for effecting venting of the brake pipe, and means correlating said members whereby venting of the brake pipe is continued by said second named means while said first named member is being moved to non-venting condition.

16. In a train control system operative to effect venting of the brake pipe of pneumatic brake equipment, means including a member movable in response to a track signal for effecting venting of said brake pipe, means including another member movable for effecting venting of the brake pipe, and a lost motion mechanical connection between said members whereby movement of the second mentioned member moves said first mentioned member to non-venting position while said second mentioned member effects continued venting of the brake pipe.

17. In a train control system, primary means adapted to be actuated by a track signal, secondary means for controlling train movements actuated in response to actuation of the primary means and constructed so as to remain in actuated condition until a manual resetting operation is effected, and means for effecting automatic resetting of said primary means upon actuation of the secondary means.

18. In a train control system for use with pneumatic braking equipment having a brake pipe adapted to be vented for a brake application, a primary control valve adapted to vent a control pipe in response to a track signal and to remain in venting condition until restored by complete reduction of pressure in said control pipe, secondary means for effecting venting of the brake pipe in response to venting of the control pipe by said primary means and adapted to remain in brake pipe venting condition until a manual resetting operation is effected, and means effective upon actuation of said secondary means for effecting substantially complete reduction of pressure in the control pipe.

In testimony whereof, I have hereunto set my hand.

HOWARD S. FOLKER.